(12) United States Patent
Haggerty et al.

(10) Patent No.: US 8,131,639 B2
(45) Date of Patent: *Mar. 6, 2012

(54) METHOD AND APPARATUS FOR ESTIMATING THE SPEND CAPACITY OF CONSUMERS

(75) Inventors: Kathleen B. Haggerty, Staten Island, NY (US); Chao M. Yuan, Montclair, NJ (US)

(73) Assignee: American Express Travel Related Services, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,627

(22) Filed: Jun. 21, 2011

(65) Prior Publication Data

US 2011/0251946 A1 Oct. 13, 2011

Related U.S. Application Data

(60) Continuation of application No. 12/368,799, filed on Feb. 10, 2009, now Pat. No. 7,991,666, which is a division of application No. 10/978,298, filed on Oct. 29, 2004, now Pat. No. 7,788,147.

(51) Int. Cl.
*G06Q 40/00* (2006.01)
*G06Q 10/00* (2006.01)
*G06Q 30/00* (2006.01)
*G07G 1/00* (2006.01)
*G06F 17/30* (2006.01)

(52) U.S. Cl. ............... 705/38; 705/1; 705/1.1; 705/10; 705/14; 705/14.13; 705/26; 705/35; 705/39

(58) Field of Classification Search ............... 705/1, 1.1, 705/10, 14, 14.13, 26, 35, 38, 39
See application file for complete search history.

(56) References Cited

U.S. PATENT DOCUMENTS

| | | | |
|---|---|---|---|
| 5,621,201 A | 4/1997 | Langhans | |
| 5,699,527 A | 12/1997 | Davidson | |
| 5,712,985 A * | 1/1998 | Lee et al. | 705/7.31 |
| 5,819,226 A * | 10/1998 | Gopinathan et al. | 705/44 |
| 5,864,830 A | 1/1999 | Armetta et al. | |
| 5,930,774 A | 7/1999 | Chennault | |
| 5,974,396 A | 10/1999 | Anderson et al. | |
| 6,021,362 A | 2/2000 | Maggard | |
| 6,058,375 A | 5/2000 | Park | |
| 6,119,103 A | 9/2000 | Basch et al. | |

(Continued)

FOREIGN PATENT DOCUMENTS

JP 2001282957 10/2001

(Continued)

OTHER PUBLICATIONS

Card Marketing; "Card companies tap credit bureaus for data streams (Experian (Orange, CA) hopes to develop data mining tools to track the 'emerging consumer', such as start-up business and immigrant populations)"; Feb. 1998; pp. 1 and 2.*

(Continued)

*Primary Examiner* — Ella Colbert
(74) *Attorney, Agent, or Firm* — Snell & Wilmer L.L.P.

(57) ABSTRACT

Time series consumer spending data, point-in-time balance information, internal customer financial data and consumer panel information provides input to a model for consumer spend behavior on plastic instruments or other financial accounts, from which approximations of spending ability may be reliably identified and utilized to promote additional consumer spending.

20 Claims, 13 Drawing Sheets

U.S. PATENT DOCUMENTS

| | | | |
|---|---|---|---|
| 6,128,599 | A | 10/2000 | Walker et al. |
| 6,134,548 | A | 10/2000 | Gottsman et al. |
| 6,185,543 | B1 | 2/2001 | Galperin et al. |
| 6,249,770 | B1* | 6/2001 | Erwin et al. ............ 725/35 |
| 6,298,348 | B1 | 10/2001 | Eldering |
| 6,307,958 | B1 | 10/2001 | Deaton et al. |
| 6,311,169 | B2 | 10/2001 | Duhon |
| 6,324,524 | B1 | 11/2001 | Lent et al. |
| 6,330,546 | B1 | 12/2001 | Gopinathan et al. |
| 6,374,230 | B1 | 4/2002 | Walker et al. |
| 6,405,181 | B2 | 6/2002 | Lent et al. |
| 6,430,539 | B1* | 8/2002 | Lazarus et al. ............ 705/7.31 |
| 6,654,727 | B2 | 11/2003 | Tilton |
| 6,687,713 | B2 | 2/2004 | Mattson et al. |
| 6,836,764 | B1* | 12/2004 | Hucal ............ 705/40 |
| 6,839,682 | B1 | 1/2005 | Blume et al. |
| 6,859,785 | B2 | 2/2005 | Case |
| 7,165,036 | B2 | 1/2007 | Kruk et al. |
| 7,191,150 | B1* | 3/2007 | Shao et al. ............ 705/38 |
| 7,249,076 | B1 | 7/2007 | Pendleton et al. |
| 7,249,114 | B2 | 7/2007 | Burchetta et al. |
| 7,324,962 | B1 | 1/2008 | Valliani et al. |
| 7,346,573 | B1 | 3/2008 | Cobrinik et al. |
| 7,373,324 | B1 | 5/2008 | Engin et al. |
| 7,376,603 | B1 | 5/2008 | Mayr et al. |
| 7,376,618 | B1* | 5/2008 | Anderson et al. ............ 705/38 |
| 7,409,362 | B2 | 8/2008 | Calabria |
| 7,516,149 | B2 | 4/2009 | Motwani et al. |
| 7,657,471 | B1 | 2/2010 | Sankaran et al. |
| 2001/0011245 | A1 | 8/2001 | Duhon |
| 2001/0013011 | A1 | 8/2001 | Day et al. |
| 2001/0027413 | A1 | 10/2001 | Bhutta |
| 2002/0019804 | A1 | 2/2002 | Sutton |
| 2002/0046096 | A1 | 4/2002 | Srinivasan et al. |
| 2002/0049626 | A1 | 4/2002 | Mathias et al. |
| 2002/0052836 | A1 | 5/2002 | Galperin et al. |
| 2002/0095360 | A1 | 7/2002 | Joao |
| 2002/0099649 | A1 | 7/2002 | Lee et al. |
| 2002/0107765 | A1 | 8/2002 | Walker |
| 2002/0133444 | A1 | 9/2002 | Sankaran et al. |
| 2002/0143661 | A1 | 10/2002 | Tumulty |
| 2002/0147623 | A1 | 10/2002 | Rifaat |
| 2002/0194099 | A1 | 12/2002 | Weiss |
| 2002/0194117 | A1 | 12/2002 | Nabe et al. |
| 2002/0194140 | A1 | 12/2002 | Makuck |
| 2003/0002639 | A1 | 1/2003 | Huie |
| 2003/0004787 | A1 | 1/2003 | Tripp et al. |
| 2003/0004855 | A1 | 1/2003 | Dutta et al. |
| 2003/0004865 | A1 | 1/2003 | Kinoshita |
| 2003/0009368 | A1 | 1/2003 | Kitts |
| 2003/0018549 | A1* | 1/2003 | Fei et al. ............ 705/30 |
| 2003/0046223 | A1 | 3/2003 | Crawford et al. |
| 2003/0061132 | A1 | 3/2003 | Yu et al. |
| 2003/0101131 | A1 | 5/2003 | Warren et al. |
| 2003/0105696 | A1 | 6/2003 | Kalotay et al. |
| 2003/0113727 | A1 | 6/2003 | Gim et al. |
| 2003/0115080 | A1 | 6/2003 | Kasravi et al. |
| 2003/0139986 | A1 | 7/2003 | Roberts |
| 2003/0149610 | A1 | 8/2003 | Rowan et al. |
| 2003/0149659 | A1 | 8/2003 | Danaher et al. |
| 2003/0208428 | A1 | 11/2003 | Raynes et al. |
| 2003/0212618 | A1 | 11/2003 | Keyes et al. |
| 2003/0229580 | A1 | 12/2003 | Gass et al. |
| 2004/0002916 | A1* | 1/2004 | Timmerman et al. ............ 705/39 |
| 2004/0024692 | A1 | 2/2004 | Turbeville et al. |
| 2004/0064401 | A1 | 4/2004 | Palaghita et al. |
| 2004/0078248 | A1 | 4/2004 | Altschuler |
| 2004/0088221 | A1 | 5/2004 | Katz et al. |
| 2004/0088257 | A1 | 5/2004 | Wong et al. |
| 2004/0093278 | A1 | 5/2004 | Burchetta et al. |
| 2004/0107123 | A1 | 6/2004 | Haffner et al. |
| 2004/0107161 | A1* | 6/2004 | Tanaka et al. ............ 705/38 |
| 2004/0111363 | A1 | 6/2004 | Trench et al. |
| 2004/0199456 | A1 | 10/2004 | Flint et al. |
| 2004/0225586 | A1 | 11/2004 | Woods et al. |
| 2004/0230459 | A1 | 11/2004 | Dordick et al. |
| 2005/0015330 | A1 | 1/2005 | Beery et al. |
| 2005/0033734 | A1* | 2/2005 | Chess et al. ............ 707/3 |
| 2005/0055275 | A1 | 3/2005 | Newman et al. |
| 2005/0080698 | A1* | 4/2005 | Perg et al. ............ 705/35 |
| 2005/0159996 | A1 | 7/2005 | Lazarus et al. |
| 2005/0197954 | A1* | 9/2005 | Maitland et al. ............ 705/39 |
| 2005/0262014 | A1 | 11/2005 | Fickes |
| 2006/0010055 | A1 | 1/2006 | Morita et al. |
| 2006/0095923 | A1 | 5/2006 | Novack et al. |
| 2006/0155624 | A1 | 7/2006 | Schwartz |
| 2006/0178957 | A1 | 8/2006 | LeClaire |
| 2006/0195390 | A1 | 8/2006 | Rusk et al. |
| 2006/0229943 | A1 | 10/2006 | Mathias et al. |
| 2006/0242039 | A1 | 10/2006 | Haggerty et al. |
| 2006/0242046 | A1 | 10/2006 | Haggerty et al. |
| 2006/0242047 | A1 | 10/2006 | Haggerty et al. |
| 2006/0242048 | A1 | 10/2006 | Haggerty et al. |
| 2006/0242049 | A1 | 10/2006 | Haggerty et al. |
| 2006/0242050 | A1 | 10/2006 | Haggerty et al. |
| 2006/0242051 | A1 | 10/2006 | Haggerty et al. |
| 2006/0253328 | A1 | 11/2006 | Kohli et al. |
| 2006/0265259 | A1 | 11/2006 | Diana et al. |
| 2006/0271552 | A1 | 11/2006 | McChesney et al. |
| 2007/0011026 | A1 | 1/2007 | Higgins et al. |
| 2007/0055598 | A1 | 3/2007 | Arnott et al. |
| 2007/0055599 | A1 | 3/2007 | Arnott |
| 2007/0067206 | A1 | 3/2007 | Haggerty et al. |
| 2007/0067207 | A1 | 3/2007 | Haggerty et al. |
| 2007/0067208 | A1 | 3/2007 | Haggerty et al. |
| 2007/0067209 | A1 | 3/2007 | Haggerty et al. |
| 2007/0078741 | A1 | 4/2007 | Haggerty et al. |
| 2007/0083418 | A1 | 4/2007 | Quiring et al. |
| 2007/0100719 | A1 | 5/2007 | Chwast et al. |
| 2007/0168246 | A1 | 7/2007 | Haggerty et al. |
| 2007/0168267 | A1 | 7/2007 | Zimmerman et al. |
| 2007/0192165 | A1 | 8/2007 | Haggerty et al. |
| 2007/0226114 | A1 | 9/2007 | Haggerty et al. |
| 2007/0226130 | A1 | 9/2007 | Haggerty et al. |
| 2008/0033852 | A1 | 2/2008 | Megdal et al. |
| 2008/0195425 | A1 | 8/2008 | Haggerty et al. |
| 2008/0195444 | A1 | 8/2008 | Haggerty et al. |
| 2008/0195445 | A1 | 8/2008 | Haggerty et al. |
| 2008/0221934 | A1 | 9/2008 | Megdal et al. |
| 2008/0221947 | A1 | 9/2008 | Megdal et al. |
| 2008/0221970 | A1 | 9/2008 | Megdal et al. |
| 2008/0221971 | A1 | 9/2008 | Megdal et al. |
| 2008/0221972 | A1 | 9/2008 | Megdal et al. |
| 2008/0221973 | A1 | 9/2008 | Megdal et al. |
| 2008/0221990 | A1 | 9/2008 | Megdal et al. |
| 2008/0222015 | A1 | 9/2008 | Megdal et al. |
| 2008/0222016 | A1 | 9/2008 | Megdal et al. |
| 2008/0222027 | A1 | 9/2008 | Megdal et al. |
| 2008/0228538 | A1 | 9/2008 | Megdal et al. |
| 2008/0228539 | A1 | 9/2008 | Megdal et al. |
| 2008/0228540 | A1 | 9/2008 | Megdal et al. |
| 2008/0228541 | A1 | 9/2008 | Megdal et al. |
| 2008/0228556 | A1 | 9/2008 | Megdal et al. |
| 2008/0228606 | A1 | 9/2008 | Megdal et al. |
| 2008/0228635 | A1 | 9/2008 | Megdal et al. |
| 2008/0243680 | A1 | 10/2008 | Megdal et al. |
| 2008/0255897 | A1 | 10/2008 | Megdal et al. |
| 2009/0132347 | A1 | 5/2009 | Anderson |
| 2009/0144160 | A1 | 6/2009 | Haggerty et al. |
| 2009/0144185 | A1 | 6/2009 | Haggerty et al. |

FOREIGN PATENT DOCUMENTS

| | | |
|---|---|---|
| JP | 2002163449 | 6/2002 |
| JP | 2003316950 | 11/2003 |
| WO | 0116896 | 3/2001 |
| WO | 0139090 | 5/2001 |
| WO | 0180053 | 10/2001 |

OTHER PUBLICATIONS

American Banker; "Eyes on Credit Software to Predict Bankruptcies in Demand (Companies that help identify consumers at risk of declaring bankruptcy are doing a booming business; some 1,350,118 peoplse filed for bankruptcy in 1998, up 95% over 1990 levels)"; Mar. 4, 1999; pp. 1 and 2.*

Wright, D.; "Comparative evaluation of electronic payment systems"; Feb. 2002; p. 1.*

Taiwan: Plastic Money Frims Break New Ground; "Plastic money turns to enterprise market"; Apr. 7, 1995; p. 1.*

Messmer, Ellen; Network World; "Firm taps B2B e-comm to boost customer service. (Company Business and Marketing"; Feb. 7, 2000; pp. 1 and 2.*

American Banker; "Amex Offers Small-Firm Card With Built-in Spending Limits"; Jul. 31, 1995; p. 1.*

Kim Namwoon; "Using Market Diffusion Models for Developing and Assessing Marketing Strategies (Technical Products)"; 1993; p. 1.*

Verstraeten, Green, PhD.; "Issues in predictive modeling of individual customer behavior: Applications in targeted marketing and consumer credit scoring"; 2005; pp. 1 and 2.*

Lisa Fickenscher; "Merchant: American Express Seeks to Mine Its Data on Cardholder Spending Patterns"; May 24, 1997, vol. 162, Issue 56; pp. 1 and 2.*

Wyatt, Craig; "Usage models just for merchants"; Sep. 1995, vol. 8, Issue 6; pp. 1-4.*

Bertrand Marotte; "powerful eye mines the depths of consumer spending: Bertrand Marotte explains how companies use information on your purchases to their advantage—and even your disadvantage.; [Final Edition]"; Jan. 14, 1998; pp. 1 and 2.*

USPTO; Notice of Allowance for U.S. Appl. No. 11/169,779 dated Aug. 20, 2010.

http://kewaneecreditbureau.com/Credit.Trends.pdf.

USPTO; Final Office Action for U.S. Appl. No. 11/586,737 dated Sep. 1, 2010.

USPTO; Non-Final Office Action for U.S. Appl. No. 12/833,741 dated Sep. 8, 2010.

USPTO; Non-Final Office Action for U.S. Appl. No. 11/611,699 dated Sep. 30, 2010.

USPTO; Notice of Allowance for U.S. Appl. No. 11/169,769 dated Oct. 1, 2010.

USPTO; Non-Final Office Action for U.S. Appl. No. 12/833,708 dated Oct. 1, 2010.

USPTO; Notice of Allowance for U.S. Appl. No. 12/777,030 dated Oct. 6, 2010.

USPTO; Notice of Allowance for U.S. Appl. No. 12/833,741 dated Oct. 13, 2010.

USPTO; Advisory Action for U.S. Appl. No. 11/615,747 dated Oct. 22, 2010.

USPTO; Advisory Action for U.S. Appl. No. 11/169,588 dated Oct. 12, 2010.

USPTO; Final Office Action for U.S. Appl. No. 11/608,179 dated Oct. 28, 2010.

USPTO; Notice of Allowance for U.S. Appl. No. 11/169,588 dated Nov. 12, 2010.

USPTO; Final Office Action for U.S. Appl. No. 12/103,403 dated Nov. 22, 2010.

USPTO; Final Office Action for U.S. Appl. No. 12/103,394 dated Nov. 22, 2010.

USPTO; Final Office Action for U.S. Appl. No. 11/497,527 dated Nov. 22, 2010.

USPTO; Final Office Action for U.S. Appl. No. 12/368,799 dated Dec. 10, 2010.

USPTO; Non-Final Office Action dated for U.S. Appl. No. 11/497,563 dated Dec. 22, 2010.

Australian Patent Office; Examiner's Report No. 4, for Australian Application No. 2006285253, dated Jan. 27, 2011.

USPTO; Final Office Action for U.S. Appl. No. 12/833,708 dated Feb. 18, 2011.

Alexander David, "Controlling Information Premia by Repackaging Asset-Backed Securities," The Journal of Risk and Insurance, Dec. 1997, 26 pages.

Chen, Yuxin et al., "Modeling Credit Card 'Share of Wallet': Solving the Incomplete Information Problem," New York University: Kaufman Management Center, http://www.gsb.stanford.edu/facseminars/events/marketing/pdfs/F2004_10-27_Chen.pdf , Oct. 27, 2004, 48 pages.

PCT; International Search Report and Written Opinion for Int'l Appln. No. PCT/US07/25964, mailed Apr. 8, 2008, 8 pages.

PCT; International Search Report and Written Opinion for PCT Application No. PCT/US07/25574, mailed May 9, 2008.

PCT; International Search Report for Int'l Appln. No. PCT/US06/25569, mailed Mar. 28, 2007, 3 pages.

PCT; International Search Report for Int'l Appln. No. PCT/US06/30384, mailed Dec. 26, 2006, 3 pages.

comScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.

Cantor, R. and Packer, F., "The Credit Rating Industry," FRBNY Quarterly Review, Summer-Fall, 1994, pp. 1-24.

Saunders, A., "Data Goldmine," Management Today, London: Mar. 2004, 6 pages.

USPTO; Advisory Action dated Feb. 23, 2011 for U.S. Appl. No. 12/368,799.

USPTO; Notice of Allowance dated Mar. 22, 2011 for U.S. Appl. No. 12/368,799.

USPTO; Advisory Action dated Mar. 11, 2010 for U.S. Appl. No. 10/978,298.

USPTO; Office Action dated Apr. 29, 2009 for U.S. Appl. No. 10/978,298.

USPTO; Office Action Restriction dated Dec. 10, 2008 for U.S. Appl. No. 10/978,298.

Dataman Group web page from Aug. 22, 2001; http://web.archive.org/web/20010822113446/http://www.datamangroup.com/summarized_credit.asp (1 of 2) on Sep. 14, 2010 10:48:45 AM.

Examiner's Report No. , for Australian Application No. 2006285253, dated Jul. 27, 2009.

Examiner's Report No. 2, for Australian Application No. 2006285253, dated Aug. 11, 2010.

Examiner's Report No. 3, for Australian Application No. 2006285253, dated Oct. 28, 2010.

JP; Office Action dated Nov. 26, 2010 in Application No. 2008-525214.

Examiner's Report No. 5, for Australian Application No. 2006285253, dated Apr. 8, 2011.

MX; Office Action dated Jun. 17, 2011 in Application No. MX/a/2007/012294.

USPTO; Office Action dated Sep. 7, 2007 in U.S. Appl. No. 11/169,589.

USPTO; Office Action dated Jan. 8, 2008 in U.S. Appl. No. 11/169,769.

USPTO; Office Action dated Mar. 11, 2008 in U.S. Appl. No. 11/169,588.

USPTO; Office Action dated Mar. 17, 2008 in U.S. Appl. No. 11/169,779.

USPTO; Office Action dated Apr. 8, 2008 in U.S. Appl. No. 11/586,737.

USPTO; Office Action dated May 13, 2008 in U.S. Appl. No. 11/169,664.

USPTO; Office Action dated May 13, 2008 in U.S. Appl. No. 11/615,747.

USPTO; Office Action dated Jul. 9, 2008 in U.S. Appl. No. 11/169,778.

USPTO; Office Action dated Jul. 16, 2008 in U.S. Appl. No. 11/497,562.

USPTO; Office Action dated Jul. 21, 2008 in U.S. Appl. No. 11/497,563.

USPTO; Office Action dated Jul. 31, 2008 in U.S. Appl. No. 11/497,521.

USPTO; Office Action dated Aug. 6, 2008 in U.S. Appl. No. 11/586,728.

USPTO; Office Action dated Aug. 21, 2008 in U.S. Appl. No. 11/169,769.

USPTO; Office Action dated Sep. 5, 2008 in U.S. Appl. No. 11/497,529.

USPTO; Office Action dated Sep. 5, 2008 in U.S. Appl. No. 11/497,530.

USPTO; Final Office Action dated Oct. 3, 2008 in U.S. Appl. No. 11/169,588.

USPTO; Office Action dated Oct. 15, 2008 in U.S. Appl. No. 11/586,737.

USPTO; Final Office Action dated Nov. 24, 2008 in U.S. Appl. No. 11/169,664.

USPTO; Office Action dated Nov. 26, 2008 in U.S. Appl. No. 11/169,779.
USPTO; Office Action dated Dec. 3, 2008 in U.S. Appl. No. 11/615,747.
USPTO; Notice of Allowance dated Jan. 5, 2009 in U.S. Appl. No. 11/169,589.
USPTO; Final Office Action dated Jan. 12, 2009 in U.S. Appl. No. 11/169,778.
USPTO; Final Office Action dated Feb. 18, 2009 in U.S. Appl. No. 11/586,728.
USPTO; Final Office Action dated Feb. 25, 2009 in U.S. Appl. No. 11/497,563.
USPTO; Final Office Action dated Mar. 18, 2009 in U.S. Appl. No. 11/497,529.
USPTO; Final Office Action dated Mar. 18, 2009 in U.S. Appl. No. 11/497,530.
USPTO; Final Office Action dated Apr. 2, 2009 in U.S. Appl. No. 11/586,737.
USPTO; Office Action dated Apr. 29, 2009 in U.S. Appl. No. 10/978,298.
USPTO; Advisory Action dated May 11, 2009 in U.S. Appl. No. 11/586,728.
USPTO; Office Action dated May 12, 2009 in U.S. Appl. No. 11/169,664.
USPTO; Advisory Action dated Jun. 8, 2009 in U.S. Appl. No. 11/497,521.
USPTO; Notice of Allowance dated Jun. 16, 2009 in U.S. Appl. No. 11/169,589.
USPTO; Advisory Action dated Jun. 18, 2009 in U.S. Appl. No. 11/497,563.
USPTO; Final Office Action dated Aug. 14, 2009 in U.S. Appl. No. 11/615,747.
USPTO; Office Action dated Nov. 25, 2009 in U.S. Appl. No. 11/586,737.
USPTO; Advisory Action dated Feb. 23, 2010 in U.S. Appl. No. 11/169,664.
USPTO; Advisory Action dated Mar. 10, 2010 in U.S. Appl. No. 11/497,527.
USPTO; Advisory Action dated Apr. 16, 2010 in U.S. Appl. No. 12/103,394.
USPTO; Advisory Action dated May 19, 2010 in U.S. Appl. No. 11/169,778.
USPTO; Advisory Action dated Jun. 15, 2010 in U.S. Appl. No. 11/497,529.
USPTO; Advisory Action dated Jun. 22, 2010 in U.S. Appl. No. 11/497,530.
USPTO; Advisory Action dated Jul. 29, 2010 in U.S. Appl. No. 12/103,418.
USPTO; Advisory Action dated Aug. 26, 2010 in U.S. Appl. No. 11/586,728.
USPTO; Advisory Action dated Sep. 2, 2010 in U.S. Appl. No. 11/497,563.
Final Office Action for U.S. Appl. No. 11/608,179 dated Oct. 28, 2010.
USPTO; Advisory Action dated Nov. 10, 2010 in U.S. Appl. No. 11/497,527.
USPTO; Advisory Action dated Nov. 10, 2010 in U.S. Appl. No. 11/586,737.
USPTO; Advisory Action dated Nov. 10, 2010 in U.S. Appl. No. 12/103,403.
USPTO; Advisory Action dated Nov. 10, 2010 in U.S. Appl. No. 12/103,394.
USPTO; Advisory Action dated Jan. 6, 2011 in U.S. Appl. No. 11/608,179.
USPTO; Advisory Action dated Feb. 1, 2011 in U.S. Appl. No. 11/497,527.
USPTO; Advisory Action dated Feb. 3, 2011 in U.S. Appl. No. 12/103,394.
USPTO; Advisory Action dated Feb. 3, 2011 in U.S. Appl. No. 12/103,403.
Non-Final Office Action for U.S. Appl. No. 12/909,645 dated Mar. 3, 2011.
Final Office Action for U.S. Appl. No. 11/611,699 dated Mar. 17, 2011.
USPTO; Notice of Allowance dated Mar. 28, 2011 in U.S. Appl. No. 12/909,645.
Non-Final Office Action for U.S. Appl. No. 12/904,732 dated Apr. 20, 2011.
Notice of Allowance for U.S. Appl. No. 12/833,708 dated May 19, 2011.
Final Office Action for U.S. Appl. No. 11/497,563 dated Jun. 3, 2011.
USPTO; Advisory Action dated Jun. 6, 2011 in U.S. Appl. No. 11/611,699.
Non-Final Office Action for U.S. Appl. No. 11/611,699 dated Jun. 23, 2011.
Non-Final Office Action for U.S. Appl. No. 11/608,179 dated Jun. 23, 2011.
Verstraeten, Geert, Ph.D.; "Issues in predictive modeling of individual customer behavior: Applications in targeted marketing and consumer credit scoring"; 2005; pp. 1 and 2.
Wyatt, Craig; "usage models just for merchants"; Credit Card Management, vol. 8, Iss. ; Sep. 1995; pp. 1-4.
Lisa Fickenscher; "Merchant: American Express Seeks to Mine Its Data on Cardholder Spending Patterns"; American Banker, vol. 162, Issue 56; Mar. 24, 1997; pp. 1-2.
AISG's National Underwriting Database, A-PLUS, is Now the Largest in the Industry, Business Wire, Aug. 7, 1997.
Credit Risk Management Report, Potomac, Mar. 9, 1998, vol. 8, Iss. 4.
Internal Revenue Service Data Book 2000, Issued Aug. 2001, Revised May 2003.
GAO-03-661 Best Practices Improved Knowledge of DOD Service Contracts Could Reveal Significant Savings, GAO, Jun. 2003.
DOE/EIA-M065(2004, Model Documentation Report: Macroeconomic Activity Module (MAM) of the National Energy Modeling System, EIA, U.S. Department of Energy, Washington DC, Feb. 2004.
Fair Isaac Announces Integrated, End-to-End Collection and Recovery Solution, Business Wire, New York, Sep. 2, 2004, p. 1.
PCT; Written Opinion for PCT Appln. No. PCT/US06/30384 dated Nov. 22, 2006.
PCT; Written Opinion for PCT Appln. No. PCT/US06/25569 dated Jan. 24, 2007.
PCT; IPRP for PCT Appln. No. PCT/US06/30384 dated Oct. 22, 2007.
PCT; IPRP for PCT Appln. No. PCT/US06/25569 dated Jan. 9, 2008.
PCT; Written Opinion for PCT Appln. No. PCT/US07/25964 dated Feb. 17, 2008.
PCT; Written Opinion for PCT Application No. PCT/US07/25574 dated Mar. 21, 2008.
USPTO; Non-Final Office Action for U.S. Appl. No. 11/169,589 dated Apr. 21, 2008.
USPTO; Final Office Action for U.S. Appl. No. 11/497,562 dated Feb. 26, 2009.
USPTO; Non-Final Office Action dated May 7, 2009 for U.S. Appl. No. 12/103,394.
USPTO; Non-Final Office Action for U.S. Appl. No. 12/103,403 dated May 11, 2009.
USPTO; Non-Final Office Action for U.S. Appl. No. 12/103,418 dated May 19, 2009.
USPTO; Non-Final Office Action for U.S. Appl. No. 11/169,779 dated Jun. 11, 2009.
PCT; IPRP for PCT Application No. PCT/US07/25574 dated Jun. 16, 2009.
PCT; IPRP for PCT Appln. No. PCT/US07/25964 dated Jun. 24, 2009.
USPTO; Non-Final Office Action for U.S. Appl. No. 11/169,778 dated Jul. 31, 2009.
USPTO; Notice of Allowance for U.S. Appl. No. 11/169,589 dated Sep. 16, 2009.
USPTO; Non-Final Office Action for U.S. Appl. No. 11/497,529 dated Sep. 16, 2009.
USPTO; Non-Final Office Action for U.S. Appl. No. 11/497,530 dated Sep. 16, 2009.

USPTO; Non-Final Office Action for U.S. Appl. No. 11/169,588 dated Nov. 19, 2009.
USPTO; Non-Final Office Action for U.S. Appl. No. 11/169,769 dated Nov. 24, 2009.
USPTO; Final Office Action for U.S. Appl. No. 11/169,664 dated Dec. 8, 2009.
USPTO; Non-Final Office Action for U.S. Appl. No. 11/586,728 dated Dec. 23, 2009.
USPTO; Final Office Action for U.S. Appl. No. 10/978,298 dated Dec. 23, 2009.
USPTO; Final Office Action for U.S. Appl. No. 11/497,527 dated Dec. 31, 2009.
USPTO; Non-Final Office Action for U.S. Appl. No. 11/497,563 dated Jan. 14, 2010.
USPTO; Non-Final Office Action for U.S. Appl. No. 11/497,521 dated Jan. 14, 2010.
USPTO; Final Office Action for U.S. Appl. No. 12/103,394 dated Feb. 1, 2010.
USPTO; Final Office Action for U.S. Appl. No. 12/103,403 dated Feb. 2, 2010.
USPTO; Non-Final Office Action for U.S. Appl. No. 11/615,747 dated Feb. 19, 2010.
USPTO; Non-Final Office Action for U.S. Appl. No. 11/169,588 dated Mar. 2, 2010.
USPTO; Final Office Action for U.S. Appl. No. 11/169,778 dated Mar. 8, 2010.
USPTO; Final Office Action for U.S. Appl. No. 11/169,769 dated Mar. 24, 2010.
USPTO; Non-Final Office Action for U.S. Appl. No. 11/586,737 dated Mar. 25, 2010.
USPTO; Final Office Action for U.S. Appl. No. 11/497,529 dated Mar. 26, 2010.
USPTO; Final Office Action for U.S. Appl. No. 11/497,530 dated Mar. 26, 2010.
USPTO; Non-Final Office Action for U.S. Appl. No. 11/497,527 dated Mar. 30, 2010.
USPTO; Non-Final Office Action for U.S. Appl. No. 12/103,403 dated Apr. 22, 2010.
USPTO; Non-Final Office Action for U.S. Appl. No. 12/103,394 dated Apr. 29, 2010.
USPTO; Final Office Action for U.S. Appl. No. 11/608,179 dated May 11, 2010.
USPTO; Final Office Action for U.S. Appl. No. 12/103,418 dated May 14, 2010.
USPTO; Notice of Allowance for U.S. Appl. No. 11/497,562 dated Jun. 1, 2010.
USPTO; Final Office Action for U.S. Appl. No. 11/586,737 dated Jun. 18, 2010.
USPTO; Notice of Allowance for U.S. Appl. No. 11/497,521 dated Jun. 23, 2010.
USPTO; Final Office Action for U.S. Appl. No. 11/497,563 dated Jun. 24, 2010.
USPTO; Final Office Action for U.S. Appl. No. 11/169,588 dated Jul. 13, 2010.
USPTO; Notice of Allowance for U.S. Appl. No. 12/368,817 dated Jul. 20, 2010.
USPTO; Non-Final Office Action for U.S. Appl. No. 12/368,799 dated Jul. 21, 2010.
USPTO; Notice of Allowance for U.S. Appl. No. 10/978,298 dated Jul. 21, 2010.
USPTO; Final Office Action for U.S. Appl. No. 11/615,747 dated Aug. 2, 2010.
William R. Dillon, John B. White, Vithala R. Rao, and Doug Filak; "Good Science"; Marketing Research; vol. 9, Iss. 4; Winter 1997; pp. 1-11.
Srikanta Chatterjee, Claudio Michelini, and Ranjan Ray; "Expenditure Patterns and Aggregate Consumer Behavior; Some Experiments with Austrialian and New Zealand Data"; The Economic Record, vol. 70, No. 210; Sep. 1994; pp. 278-291.
Jost, Allen; Credit World, v81, n4; Neural networks; Mar./Apr. 1993; pp. 1-9.
American Banker; "AT&T Expected to Turn Up Heat in Card Wars"; vol. 158, No. 101; May 27, 1993; pp. 1-3.
Credit Card Management; "Neural Nets Shoot for Jackpot"; Dec. 1995; pp. 1-6.
Bank Technology News; "The Road to Better Credit-Card Marketing"; Sep. 1995; pp. 1-4.
USPTO; Final Office Action for U.S. Appl. No. 11/497,527 dated Aug. 16, 2010.
USPTO; Final Office Action for U.S. Appl. No. 12/103,403 dated Aug. 16, 2010.
USPTO; Final Office Action for U.S. Appl. No. 12/103,394 dated Aug. 17, 2010.

* cited by examiner

500 ← → 502

| From Experian TrendView | | | From ComScore Data | | | |
|---|---|---|---|---|---|---|
| Balance 3 | Balance 2 | Balance 1 | Purchase Volume | Last Payment | Previous balance | New Balance |
| 219 | 25 | 229 | 1465.47 | 1263.39 | 25.51 | 229.12 |
| 37 | 2 | 566 | 1187.14 | 650.64 | 2.64 | 566.11 |
| 6928 | 9192 | 27 | 10162.2 | 19354.84 | 9192.55 | 27.56 |
| 1434 | 32 | 54 | 1021.95 | 1000 | 32.05 | 54 |

|  |  | Predicted Paydown Percent | | | | |
|---|---|---|---|---|---|---|
|  |  | <5% | 5-20% | 20-50% | 50%-80% | 80%+ |
| Actual paydown percent | <5% | 55604 | 12230 | 1359 | 31 | 0 |
|  | 5-20% | 1314 | 5422 | 2282 | 54 | 1 |
|  | 20-50% | 64 | 429 | 1835 | 333 | 13 |
|  | 50%-80% | 1 | 41 | 492 | 301 | 53 |
|  | 80%+ | 0 | 22 | 534 | 1236 | 429 |

|  |  | Prediction | |
|---|---|---|---|
|  |  | Revolver | Transactor |
| Actual | Revolver | 80539 | 432 |
|  | Transactor | 1090 | 2019 |

|  |  | Predict | |
|---|---|---|---|
|  |  | No BT in | BT in |
| Actual | No BT in | 148,326 | 6,526 |
|  | BT in | 9,534 | 9,832 |

FIG. 13

| Dollar Figure | | Predicted Spending | | | | |
|---|---|---|---|---|---|---|
| | | <$500 | $500-1000 | $1000-2000 | $2000-5000 | >$5000 |
| Actual Spending | <$500 | 98,483 | 8,611 | 1,818 | 727 | 200 |
| | $500-1000 | 3,863 | 10,658 | 3,210 | 651 | 87 |
| | $1000-2000 | 2,220 | 2,474 | 7,192 | 2,727 | 245 |
| | $2000-5000 | 2,457 | 1,373 | 4,390 | 11,197 | 1,236 |
| | >$5000 | 520 | 336 | 1,011 | 3,512 | 5,020 |

| Dollar Figure | | Predicted Spending | | | | |
|---|---|---|---|---|---|---|
| | | <$500 | $500-1000 | $1000-2000 | $2000-5000 | >$5000 |
| Actual Spending | <$500 | 116,821 | 7,388 | 2,521 | 1,269 | 98 |
| | $500-1000 | 6,118 | 15,455 | 6,908 | 1,635 | 70 |
| | $1000-2000 | 3,074 | 8,383 | 31,477 | 5,794 | 181 |
| | $2000-5000 | 826 | 2,200 | 9,052 | 36,441 | 797 |
| | >$5000 | 7 | 19 | 95 | 838 | 2,880 |

1600

| | | Predicted Average Monthly Spending | | | | |
|---|---|---|---|---|---|---|
| | | <$500 | $500-1000 | $1000-2000 | $2000-5000 | >$5000 |
| Actual Spending | <$500 | 524,328 | 36,853 | 9,116 | 3,083 | 481 |
| | $500-1000 | 25,942 | 104,009 | 17,292 | 3,304 | 280 |
| | $1000-2000 | 8,478 | 20,132 | 82,363 | 10,722 | 583 |
| | $2000-5000 | 3,574 | 4,125 | 15,852 | 57,077 | 2,250 |
| | >$5000 | 557 | 399 | 1,184 | 4,624 | 8,323 |

| Rank Order | | Predicted Spending | |
|---|---|---|---|
| | | below 10% (< $1950) | top 10% (> $1950) |
| Actual Spending | below 10% (< $2050) | 827,716 | 22,721 |
| | top 10% (>$2050) | 22,721 | 71,773 |

| | | Predicted Annual Total Spending | | | |
|---|---|---|---|---|---|
| | | <$10K | $10K-20K | $20-50K | >$50K |
| Actual Annual Total Spending | <$10K | 656,404 | 34,314 | 6,528 | 340 |
| | $10K-20K | 31,931 | 87,143 | 12,818 | 170 |
| | $20-50K | 3,390 | 21,242 | 68,009 | 1,715 |
| | >$50K | 112 | 582 | 7,525 | 9,018 |

| Rank Order | | Predicted Annual Total Spending | | | |
|---|---|---|---|---|---|
| | | Below top 20% (<$13K) | Top10-20% ($13K-21.5K) | Top 5-10% ($21.5K-30.4K) | Top 5% (>$30.4K) |
| Actual Annual Total Spending | Below top 20% (<$13K) | 720,180 | 24,610 | 5,334 | 2,629 |
| | Top10-20% ($13K-22.5K) | 27,336 | 51,082 | 7,477 | 2,366 |
| | Top 5-10% ($22.5K-32.9K) | 3,994 | 13,907 | 22,778 | 4,182 |
| | Top 5% (>$32.9K) | 1,483 | 4,525 | 11,473 | 37,885 |

FIG. 19

METHOD AND APPARATUS FOR ESTIMATING THE SPEND CAPACITY OF CONSUMERS

CROSS-REFERENCE TO RELATED APPLICATIONS

This disclosure is a continuation of and claims priority to, and the benefit of, U.S. Ser. No. 12/368,799, filed on Feb. 10, 2009 and entitled "METHOD AND APPARATUS FOR ESTIMATING THE SPEND CAPACITY OF CONSUMERS." The '799 disclosure is a divisional of, and claims benefit of, U.S. Pat. No. 7,788,147 issued on Aug. 31, 2010 and entitled "METHOD AND APPARATUS FOR ESTIMATING THE SPEND CAPACITY OF CONSUMERS" (aka U.S. Ser. No. 10/978,298 filed on Oct. 29, 2004). Both of which are hereby incorporated by reference in their entirety.

TECHNICAL FIELD

This disclosure generally relates to financial data processing, and in particular it relates to credit scoring, customer profiling, consumer behavior analysis and modeling.

BACKGROUND OF THE DISCLOSURE

It is axiomatic that consumers will tend to spend more when they have greater purchasing power. The capability to accurately estimate a consumer's spend capacity could therefore allow a financial institution (such as a credit company, lender or any consumer services companies) to better target potential prospects and identify any opportunities to increase consumer transaction volumes, without an undue increase in the risk of defaults. Attracting additional consumer spending in this manner, in turn, would increase such financial institution's revenues, primarily in the form of an increase in transaction fees and interest payments received. Consequently, a consumer model that can accurately estimate purchasing power is of paramount interest to many financial institutions and other consumer services companies.

A limited ability to estimate consumer spend behavior from point-in-time credit data has previously been available. A financial institution can, for example, simply monitor the balances of its own customers' accounts. When a credit balance is lowered, the financial institution could then assume that the corresponding consumer now has greater purchasing power. However, it is oftentimes difficult to confirm whether the lowered balance is the result of a balance transfer to another account. Such balance transfers represent no increase in the consumer's capacity to spend, and so this simple model of consumer behavior has its flaws.

In order to achieve a complete picture of any consumer's purchasing ability, one must examine in detail the full range of a consumer's financial accounts, including credit accounts, checking and savings accounts, investment portfolios, and the like. However, the vast majority of consumers do not maintain all such accounts with the same financial institution and the access to detailed financial information from other financial institutions is restricted by consumer privacy laws, disclosure policies and security concerns.

There is limited and incomplete consumer information from credit bureaus and the like at the aggregate and individual consumer levels. Since balance transfers are nearly impossible to consistently identify from the face of such records, this information has not previously been enough to obtain accurate estimates of a consumer's actual spending ability. Accordingly, there is a need for a method and apparatus for modeling consumer spending behavior which addresses certain problems of existing technologies.

SUMMARY OF THE DISCLOSURE

It is an object of the present disclosure, therefore, to introduce a method for modeling consumer behavior and applying the model to both potential and actual customers (who may be individual consumers or businesses) to determine their spend over previous periods of time (sometimes referred to herein as the customer's size of wallet) from tradeline data sources. The share of wallet by tradeline or account type may also be determined. At the highest level, the size of wallet is represented by a consumer's or business' total aggregate spending and the share of wallet represents how the customer uses different payment instruments.

In various embodiments, a method and apparatus for modeling consumer behavior includes receiving individual and aggregated consumer data for a plurality of different consumers. The consumer data may include, for example, time series tradeline data, consumer panel data, and internal customer data. One or more models of consumer spending patterns are then derived based on the consumer data for one or more categories of consumer. Categories for such consumers may be based on spending levels, spending behavior, tradeline user and type of tradeline.

In various embodiments, a method and apparatus for estimating the spending levels of an individual consumer is next provided, which relies on the models of consumer behavior above. Size of wallet calculations for individual prospects and customers are derived from credit bureau data sources to produce outputs using the models.

Balance transfers into credit accounts are identified based on individual tradeline data according to various algorithms, and any identified balance transfer amount is excluded from the spending calculation for individual consumers. The identification of balance transfers enables more accurate utilization of balance data to reflect consumer spending.

When consumer spending levels are reliably identified in this manner, customers may be categorized to more effectively manage the customer relationship and increase the profitability therefrom.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 5 is a diagram of financial data used for model generation and validation according to the process of FIG. 2;

FIGS. 11-19 are tables showing exemplary results and outputs of the process of FIG. 6 against a sample consumer population.

DETAILED DESCRIPTION OF THE SPECIFIC EMBODIMENTS

Figure 1:
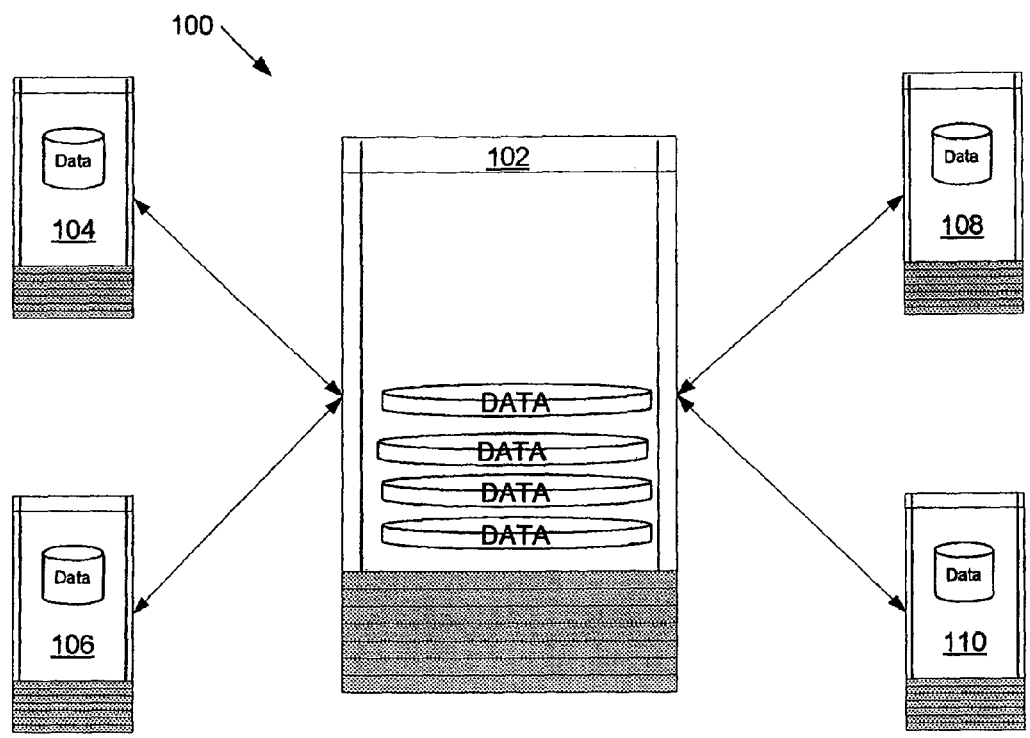
FIG. 1 is a block diagram of an exemplary financial data exchange network over which the processes of the present disclosure may be performed.

As used herein, the following terms shall have the following meanings. A trade or tradeline refers to a credit or charge vehicle issued to an individual customer by a credit grantor. Types of tradelines include bank loans, credit card accounts, retail cards, personal lines of credit and car loans/leases. For purposes here, use of the term credit card shall be construed to include charge cards except as specifically noted. Tradeline data describes the customer's account status and activity, including, for example, names of companies where the customer has accounts, dates such accounts were opened, credit limits, types of accounts, balances over a period of time and summary payment histories. Tradeline data is generally available for the vast majority of actual consumers. Tradeline data, however, does not include individual transaction data, which is largely unavailable because of consumer privacy protections. Tradeline data may be used to determine both individual and aggregated consumer spending patterns, as described herein.

Consumer panel data measures consumer spending patterns from information that is provided by, typically, millions of participating consumer panelists. Such consumer panel data available through various consumer research companies such as COMSCORE. Consumer panel data may typically include individual consumer information such as credit risk scores, credit card application data, credit card purchase transaction data, credit card statement views, tradeline types, balances, credit limits, purchases, balance transfers, cash advances, payments made, finance charges, annual percentage rates and fees charged. Such individual information from consumer panel data, however, is limited to those consumers who have participated in the consumer panel, and so such detailed data may not be available for all consumers.

Technology advances have made it possible to store, manipulate and model large amounts of time series data with minimal expenditure on equipment. As will now be described, a financial institution may leverage these technological advances in conjunction with the types of consumer data presently available in the marketplace to more readily estimate the spend capacity of potential and actual customers. A reliable capability to assess the size of a consumer's wallet is introduced in which aggregate time series and raw tradeline data are used to model consumer behavior and attributes, and identify categories of consumers based on aggregate behavior. The use of raw trade-line time series data, and modeled consumer behavior attributes, including but not limited to, consumer panel data and internal consumer data, allows actual consumer spend behavior to be derived from point in time balance information.

In addition, the advent of consumer panel data provided through internet channels provides continuous access to actual consumer spend information for model validation and refinement. Industry data, including consumer panel information having consumer statement and individual transaction data, may be used as inputs to the model and for subsequent verification and validation of its accuracy. The model is developed and refined using actual consumer information with the goals of improving the customer experience and increasing billings growth by identifying and leveraging increased consumer spend opportunities.

A credit provider or other financial institution may also make use of internal proprietary customer data retrieved from its stored internal financial records. Such internal data provides access to even more actual customer spending information, and may be used in the development, refinement and validation of aggregated consumer spending models, as well as verification of the models' applicability to existing individual customers on an ongoing basis.

While there has long been market place interest in understanding spend to align offers with consumers and assign credit line size, the holistic approach of using a size of wallet calculation across customers lifecycles (that is, acquisitions through collections) has not previously been provided. The various data sources outlined above provide the opportunity for unique model logic development and deployment, and as described in more detail in the following, various categories of consumers may be readily identified from aggregate and individual data. In certain embodiments of the processes disclosed herein, the models may be used to identify specific types of consumers, nominally labeled 'transactors' and 'revolvers,' based on aggregate spending behavior, and to then identify individual customers and prospects that fall into one of these categories. Consumers falling into these categories may then be offered commensurate purchasing incentives based on the model's estimate of consumer spending ability.

Referring now to FIGS. 1-19, wherein similar components of the present disclosure are referenced in like manner, various embodiments of a method and system for estimate the purchasing ability of consumers will now be described in detail.

Turning now to FIG. 1, there is depicted an exemplary computer network 100 over which the transmission of the various types of consumer data as described herein may be accomplished, using any of a variety of available computing components for processing such data in the manners described below. Such components may include an institution computer 102, which may be a computer, workstation or server, such as those commonly manufactured by IBM, and operated by a financial institution or the like. The institution computer 102, in turn, has appropriate internal hardware, software, processing, memory and network communication components that enables it to perform the functions described here, including storing both internally and externally obtained individual or aggregate consumer data in appropriate memory and processing the same according to the processes described herein using programming instructions provided in any of a variety of useful machine languages.

The institution computer 102 may in turn be in operative communication with any number of other internal or external computing devices, including for example components 104, 106, 108, and 110, which may be computers or servers of similar or compatible functional configuration. These components 104-110 may gather and provide aggregated and individual consumer data, as described herein, and transmit the same for processing and analysis by the institution computer 102. Such data transmissions may occur for example over the Internet or by any other known communications infrastructure, such as a local area network, a wide area network, a wireless network, a fiber-optic network, or any combination or interconnection of the same. Such communications may also be transmitted in an encrypted or otherwise secure format, in any of a wide variety of known manners.

Each of the components 104-110 may be operated by either common or independent entities. In one exemplary embodiment, which is not to be limiting to the scope of the present disclosure, one or more such components 104-110 may be operated by a provider of aggregate and individual consumer tradeline data, an example of which includes services provided by EXPERIAN. Tradeline level data preferably includes up to 24 months or more of balance history and credit attributes captured at the tradeline level, including information about accounts as reported by various credit grantors, which in turn may be used to derive a broad view of actual aggregated consumer behavioral spending patterns.

Alternatively, or in addition thereto, one or more of the components 104-110 may likewise be operated by a provider of individual and aggregate consumer panel data, such as commonly provided by COMSCORE. Consumer panel data provides more detailed and specific consumer spending information regarding millions of consumer panel participants, who provide actual spend data to collectors of such data in exchange for various inducements. The data collected may include any one or more of credit risk scores, online credit card application data, online credit card purchase transaction data, online credit card statement views, credit trade type and credit issuer, credit issuer code, portfolio level statistics, credit bureau reports, demographic data, account balances, credit limits, purchases, balance transfers, cash advances, payment amounts, finance charges, annual percentage interest rates on accounts, and fees charged, all at an individual level for each of the participating panelists. In various embodiments, this type of data is used for model development, refinement and verification. This type of data is further advantageous over tradeline level data alone for such purposes, since such detailed information is not provided at the tradeline level. While such detailed consumer panel data can be used alone to generate a model, it may not be wholly accurate with respect to the remaining marketplace of consumers at large without further refinement. Consumer panel data may also be used to generate aggregate consumer data for model derivation and development.

Additionally, another source of inputs to the model may be internal spend and payment history of the institution's own customers. From such internal data, detailed information at the level of specificity as the consumer panel data may be obtained and used for model development, refinement and validation, including the categorization of consumers based on identified transactor and revolver behaviors.

Figure 2:
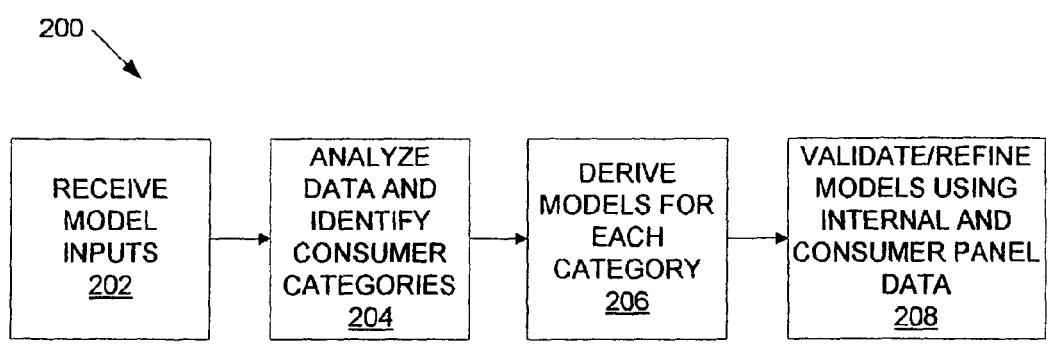
FIG. 2 is a flowchart of an exemplary consumer modeling process performed by the financial server of FIG. 1.

Turning now to FIG. 2, there is depicted a flowchart of an exemplary process 200 for modeling aggregate consumer behavior in accordance with the present disclosure. The process 200 commences at step 202 wherein individual and aggregate consumer data, including time-series tradeline data, consumer panel data and internal customer financial data, is obtained from any of the data sources described previously as inputs for consumer behavior models. In certain embodiments, the individual and aggregate consumer data may be provided in a variety of different data formats or structures and consolidated to a single useful format or structure for processing.

Next, at step 204, the individual and aggregate consumer data is analyzed to determine consumer spending behavior patterns. One of ordinary skill in the art will readily appreciate that the models may include formulas that mathematically describe the spending behavior of consumers. The particular formulas derived will therefore highly depend on the values resulting from customer data used for derivation, as will be readily appreciated. However, by way of example only and based on the data provided, consumer behavior may be modeled by first dividing consumers into categories that may be based on account balance levels, demographic profiles, household income levels or any other desired categories. For each of these categories in turn, historical account balance and transaction information for each of the consumers may be tracked over a previous period of time, such as one to two years. Algorithms may then be employed to determine formulaic descriptions of the distribution of aggregate consumer information over the course of that period of time for the population of consumers examined, using any of a variety of known mathematical techniques. These formulas in turn may be used to derive or generate one or more models (step 206) for each of the categories of consumers using any of a variety of available trend analysis algorithms. The models may yield the following types of aggregated consumer information for each category: average balances, maximum balances, standard deviation of balances, percentage of balances that change by a threshold amount, and the like.

Finally, at step 208, the derived models may validated and periodically refined using internal customer data and consumer panel data from sources such as COMSCORE. In various embodiments, the model may be validated and refined over time based on additional aggregated and individual consumer data as it is continuously received by an institution computer 202 over the network 200. Actual customer transaction level information and detailed consumer information panel data may be calculated and used to compare actual consumer spend amounts for individual consumers (defined for each month as the difference between the sum of debits to the account and any balance transfers into the account) and the spend levels estimated for such consumers using the process 200 above. If a large error is demonstrated between actual and estimated amounts, the models and the formulas used may be manually or automatically refined so that the error is reduced. This allows for a flexible model that has the capability to adapt to actual aggregated spending behavior as it fluctuates over time.

Figure 3:
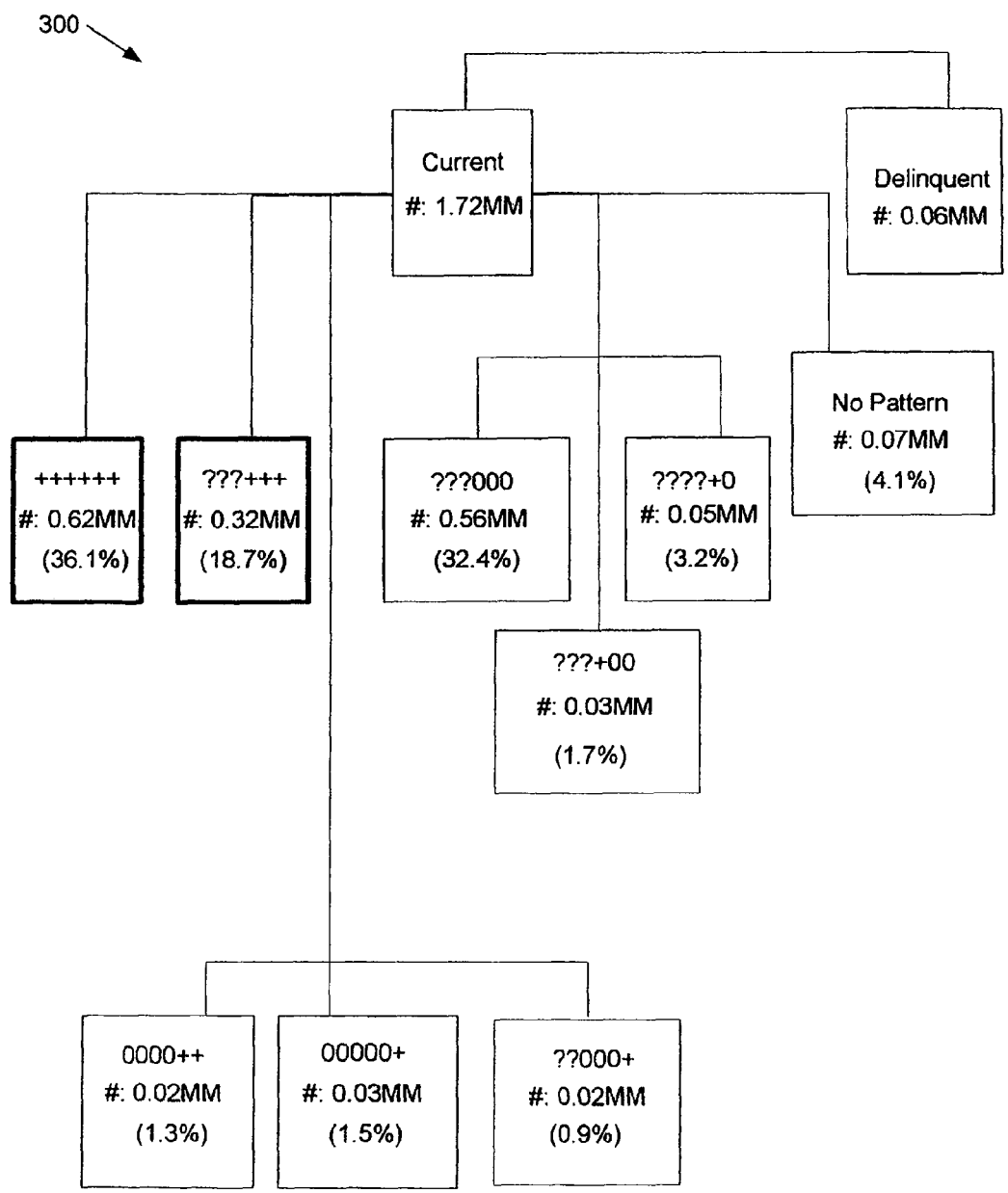
FIG. 3 is a diagram of exemplary categories of consumers examined during the process of FIG. 2.

As shown in the diagram 300 of FIG. 3, a population of consumers for which individual and/or aggregated data has been provided may be divided first into two general categories for analysis, for example, those that are current on their credit accounts (representing 1.72 million consumers in the exemplary data sample size of 1.78 million consumers) and those that are delinquent (representing 0.06 million of such consumers). In one embodiment, delinquent consumers may be discarded from the populations being modeled.

In further embodiments, the population of current consumers is then subdivided into a plurality of further categories based on the amount of balance information available and the balance activity of such available data. In the example shown in the diagram 300, the amount of balance information available is represented by string of '+' '0' and '?' characters. Each character represents one month of available data, with the rightmost character representing the most current months and the leftmost character representing the earliest month for which data is available. In the example provided in FIG. 3, a string of six characters is provided, representing the six most recent months of data for each category. The '+' character represents a month in which a credit account balance of the consumer has increased. The "0" character may represent months where the account balance is zero. The "?" character represents months for which balance data is unavailable. Also provided the diagram is number of consumers fallen to each category and the percentage of the consumer population they represent in that sample.

Figure 4:
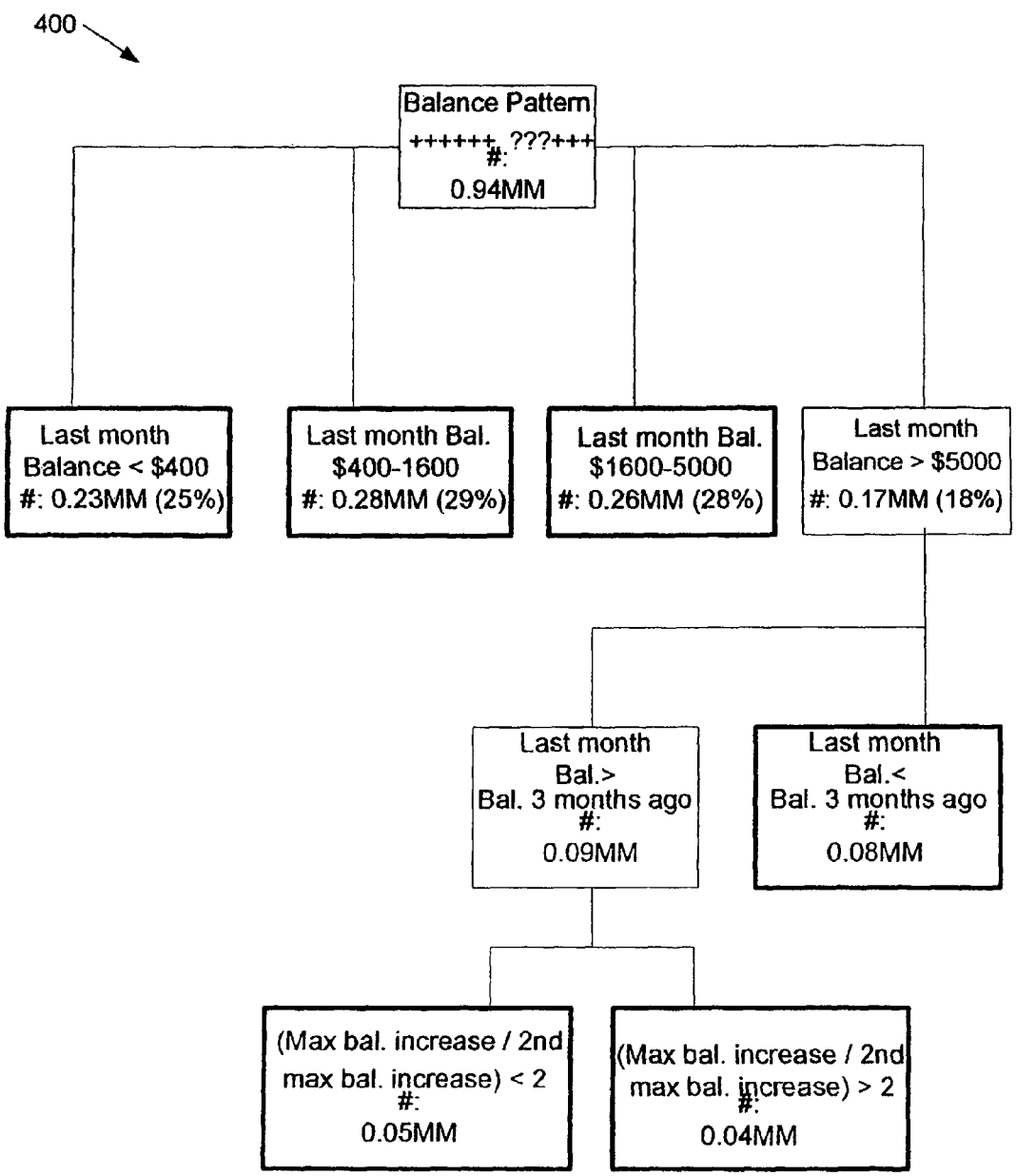
FIG. 4 is a diagram of exemplary subcategories of consumers modeled during the process of FIG. 2.

In further embodiments, only certain categories of consumers may be selected for modeling behavior. The selection may be based on those categories that demonstrate increased spend on their credit balances over time. However, it should be readily appreciated that other categories can be used. FIG. 4 shows the example of two categories selected consumers for modeling in bold. These groups show the availability of at least the three most recent months of balance data and that the balances increased in each of those months.

Turning now to FIG. 4, therein is depicted an exemplary diagram 400 showing sub-categorization of the two categories of FIG. 3 in bold that are selected for modeling. In the embodiment shown, the sub-categories may include: consumers having a most recent credit balance less than $400; consumers having a most recent credit balance between $400 and $1600; consumers having a most recent credit balance between $1600 and $5000; consumers whose most recent credit balance is less than the balance of, for example, three months ago; consumers whose maximum credit balance increase over, for example, the last twelve months divided by the second highest maximum balance increase over the same period is less than 2; and consumers whose maximum credit balance increase over the last twelve months divided by the second highest maximum balance increase is greater than 2. It should be readily appreciated that other subcategories can be used. Each of these sub-categories is defined by their last month balance level. The number of consumer from the sample population (in millions) and the percentage of the population for each category are also shown in FIG. 4.

There may be a certain balance threshold established, wherein if a consumer's account balance is too high, their behavior may not be modeled, since such consumers are less likely to have sufficient spending ability. Alternatively, or in addition thereto, consumers having balances above such threshold may be sub-categorized yet again, rather than completely discarded from the sample. In the example shown in FIG. 4, the threshold value may be $5000, and only those having particular historical balance activity may be selected, i.e. those consumers whose present balance is less than their balance three months earlier, or whose maximum balance increase in the examined period meets certain parameters. Other threshold values may also be used and may be dependent on the individual and aggregated consumer data provided.

As described in the foregoing, the models generated in the process 200 may be derived, validated and refined using tradeline and consumer panel data. An example of tradeline data 500 from EXPERIAN and consumer panel data 502 from COMSCORE are represented in FIG. 5. Each row of the data 500, 502 represents the record of one consumer and thousands of such records may be provided at a time. The statement 500 shows the point-in-time balance of consumers accounts for three successive months (Balance 1, Balance 2 and Balance 3). The data 502 shows each consumer's purchase volume, last payment amount, previous balance amount and current balance. Such information may be obtained, for example, by page scraping the data (in any of a variety of known manners using appropriate application programming interfaces) from an Internet web site or network address at which the data 502 is displayed. furthermore, the data 500 and 502 may be matched by consumer identity and combined by one of the data providers or another third party independent of the financial institution. Validation of the models using the combined data 500 and 502 may be then be performed, and such validation may be independent of consumer identity.

Figure 6:
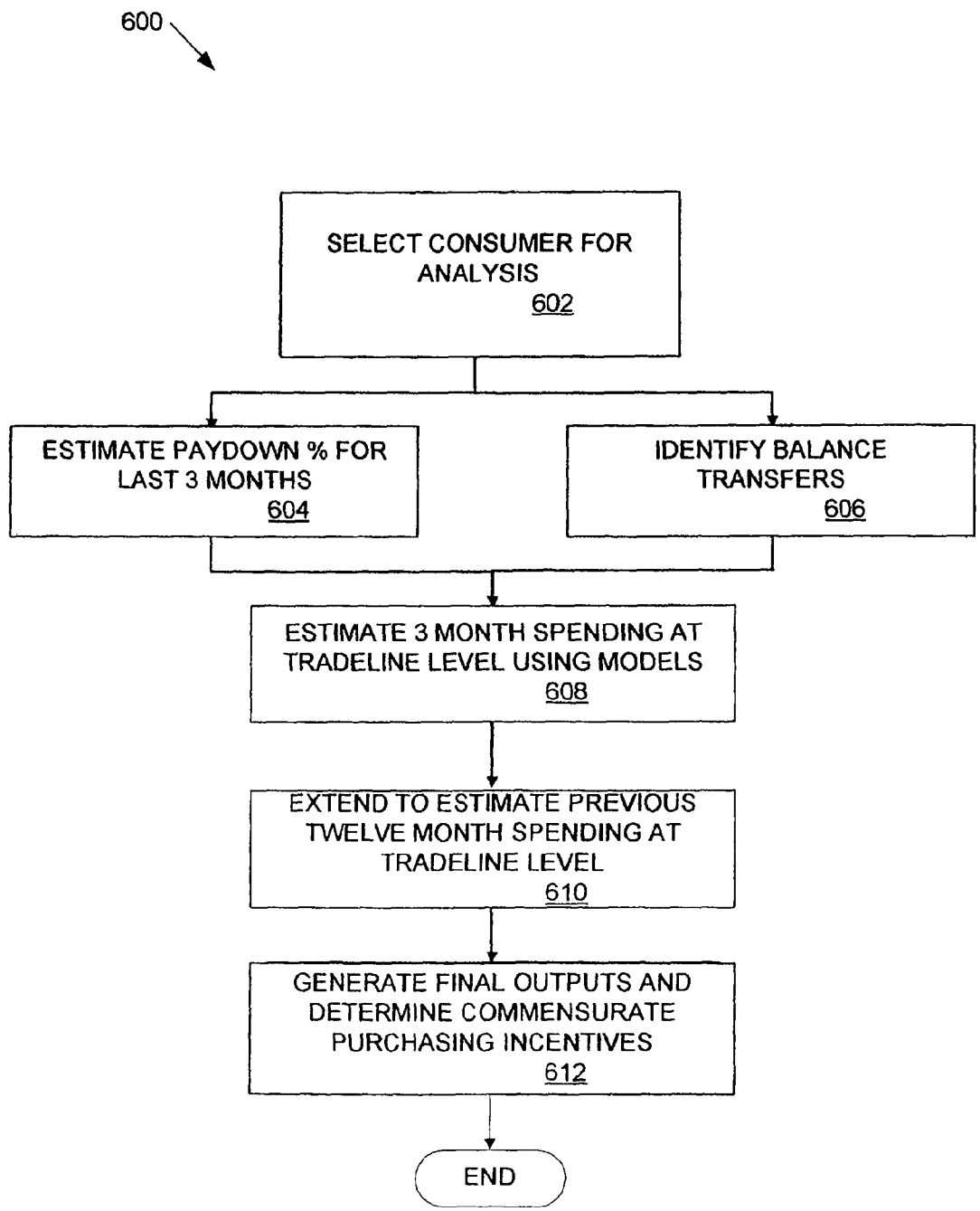
FIG. 6 is a flowchart of an exemplary process for estimating the spend ability of a consumer, performed by the financial server of FIG. 1.

Turning now to FIG. 6, therein is depicted an exemplary process 600 for estimating the size of an individual consumer's spending wallet. Upon completion of the modeling of the consumer categories above, the process 600 commences with the selection of individual consumers or prospects to be examined (step 602). An appropriate model derived during the process 200 will then be applied to the presently available consumer tradeline information in the following manner to determine, based on the results of application of the derived models, an estimate of a consumer's size of wallet. Each consumer of interest may be selected based on their falling into one of the categories selected for modeling described above, or may be selected using any of a variety of criteria.

The process 600 continues to step 604 where, for a selected consumer, a paydown percentage over a previous period of time is estimated for each of the consumer's credit accounts. In one embodiment, the paydown percentage is estimated over the previous three-month period of time based on available tradeline data, and maybe calculated according to the following formula:

Pay-down %=(The sum of the last three months payments from the account)/(The sum of three month balances for the account based on tradeline data).

The paydown percentage may be set to, for example, 2%, for any consumer exhibiting less than a 5% paydown percentage, and may be set to 100% if greater than 80%, as a simplified manner for estimating consumer spending behaviors on either end of the paydown percentage scale.

Consumers that exhibit less than a 50% paydown during this period may be categorized as revolvers, while consumers exhibited a 50% paydown or greater may be categorized as transactors. These categorizations may be used to initially determine what, if any, purchasing incentives may be available to the consumer, as described later below.

The process 600, then continues to step 606, where balance transfers for a previous period of time are identified from the available tradeline data for the consumer. The identification of balance transfers are essential since, although tradeline data may reflect a higher balance on a credit account over time, such higher balance may simply be the result of a transfer of a balance into the account, and are thus not indicative of a true increase in the consumer's spending. It is difficult to confirm balance transfers based on tradeline data since the information available is not provided on a transaction level basis. In addition, there are typically lags or absences of reporting of such values on tradeline reports.

Nonetheless, marketplace analysis using confirmed consumer panel and internal customer financial records has revealed reliable ways in which balance transfers into an account may be identified from imperfect individual tradeline data alone. Three exemplary reliable methods for identifying balance transfers from credit accounts, each which is based in part on actual consumer data sampled, are as follows. It should be readily apparent that these formulas in this form are not necessary for all embodiments of the present process and may vary based on the consumer data used to derive them.

A first rule identifies a balance transfer for a given consumer's credit account as follows: The month having the largest balance increase in the tradeline data, and which satisfies the following conditions, may be identified as a month in which a balance transfer has occurred:

The maximum balance increase is greater than twenty times the second maximum balance increase for the remaining months of available data;

The estimated pay-down percent calculated at step 306 above is less than 40%; and The largest balance increase is greater than $1000 based on the available data.

A second rule identifies a balance transfer for a given consumer's credit account in any month where the balance is above twelve times the previous month's balance and the next month's balance differs by no more than 20%.

A third rule identifies a balance transfer for a given consumer's credit account in any month where:

the current balance is greater than 1.5 times the previous month's balance;

the current balance minus the previous month's balance is greater than $4500; and the estimated pay-down percent from step 306 above is less than 30%.

The process 600 then continues to step 608, where consumer spending on each credit account is estimated over the next, for example, three month period. In estimating consumer spend, any spending for a month in which a balance transfer has been identified from individual tradeline data above is set to zero for purposes of estimating the size of the consumer's spending wallet, reflecting the supposition that no real spending has occurred on that account. The estimated spend for each of the three previous months may then be calculated as follows:

Estimated spend=(the current balance−the previous month's balance+(the previous month's balance*the estimated pay-down % from step 604 above).

The exact form of the formula selected may be based on the category in which the consumer is identified from the model applied, and the formula is then computed iteratively for each of the three months of the first period of consumer spend.

Next, at step 610 of the process 600, the estimated spend is then extended over, for example, the previous three quarterly or three-month periods, providing a most-recent year of estimated spend for the consumer.

Finally, at step 612, This in turn, may be used to generate a plurality of final outputs for each consumer account (step 314). These may be provided in an output file that may include a portion or all of the following exemplary information, based on the calculations above and information available from individual tradeline data:

(i) size of previous twelve month spending wallet; (ii) size of spending wallet for each of the last four quarters; (iii) total number of revolving cards, revolving balance, and average pay down percentage for each; (iv) total number of transacting cards, and transacting balances for each; (v) the number of balance transfers and total estimated amount thereof; (vi) maximum revolving balance amounts and associated credit limits; and (vii) maximum transacting balance and associated credit limit.

After step 612, the process 600 ends with respect to the examined consumer. It should be readily appreciated that the process 600 may be repeated for any number of current customers or consumer prospects.

Figure 7:
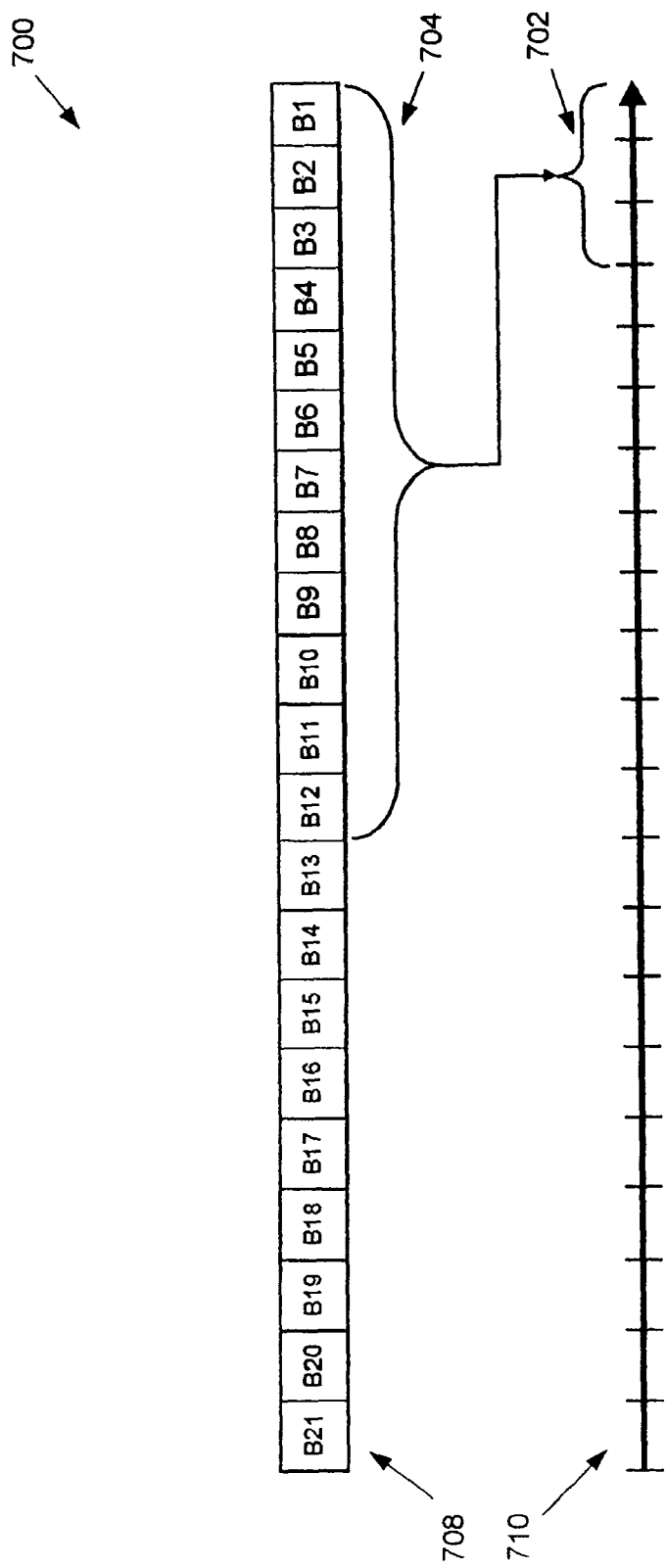
FIGS. 7-10 are exemplary timelines showing the rolling time periods for which individual customer data is examined during the process of FIG. 6.

Referring now to FIGS. 7-10, therein is depicted illustrative diagrams 700-1000 of how such estimated spending is calculated in a rolling manner across each previous three month (quarterly) period. In FIG. 7, there is depicted a first three month period (i.e., the most recent previous quarter) 702 on a timeline 710. As well, there is depicted a first twelve-month period 704 on a timeline 708 representing the last twenty-one months of point-in-time account balance information available from individual tradeline data for the consumer' account. Each month's balance for the account is designated as "B#." B1-B12 represent actual account balance information available over the past twelve months for the consumer. B13-B21 represent consumer balances over consecutive, preceding months.

In accordance with the diagram 700, spending in each of the three months of the first quarter 702 is calculated based on the balance values B1-B12, the category of the consumer based on consumer spending models generated in the process 200, and the formulas used in steps 604 and 606.

Figure 8:
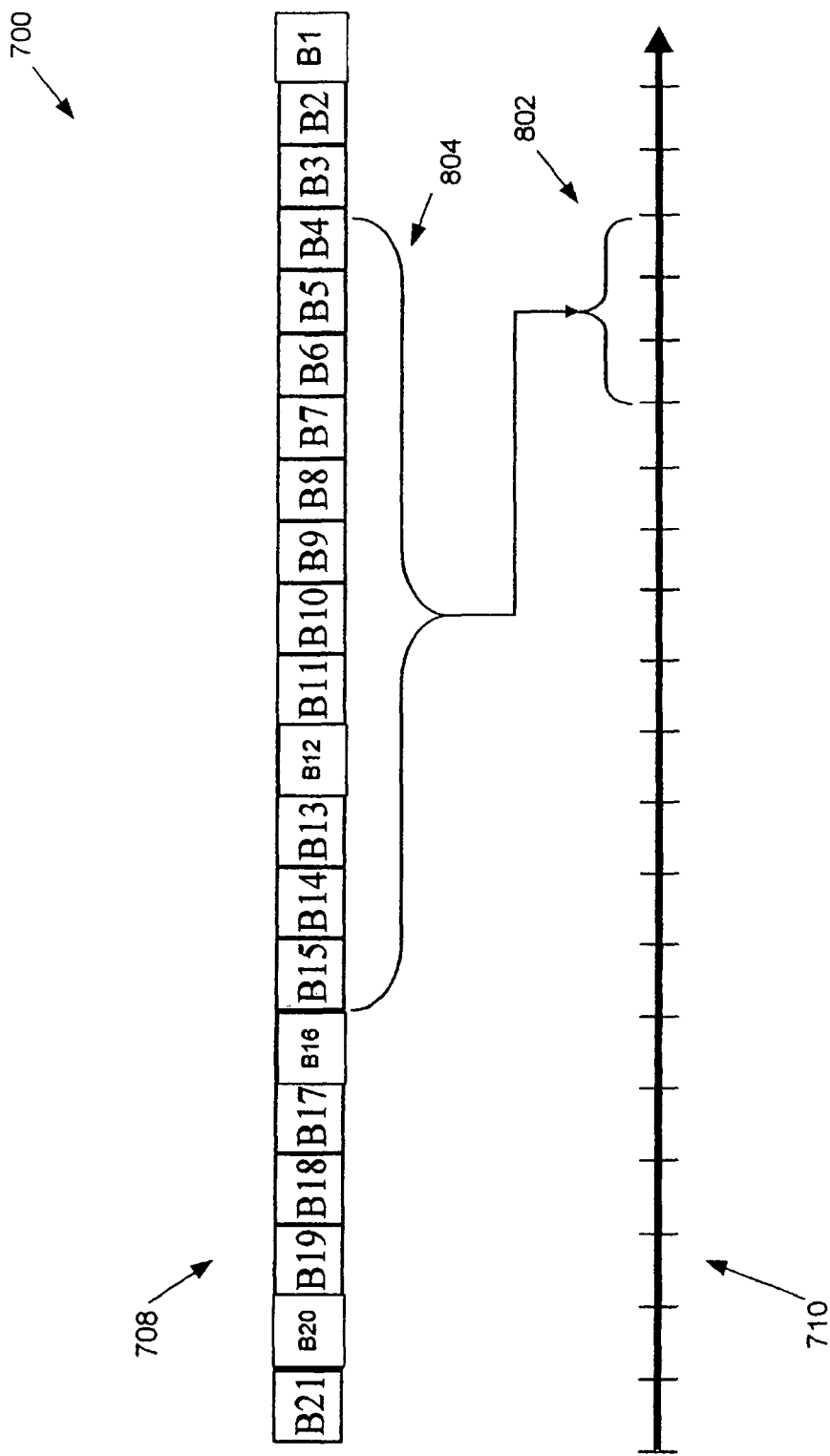

Turning now to FIG. 8, there is shown a diagram 800 illustrating the balance information used for estimating spending in a second previous quarter 802 using a second twelve-month period of balance information 804. Spending in each of these three months of the second previous quarter 802 is based on known balance information B4-B15.

Figure 9:
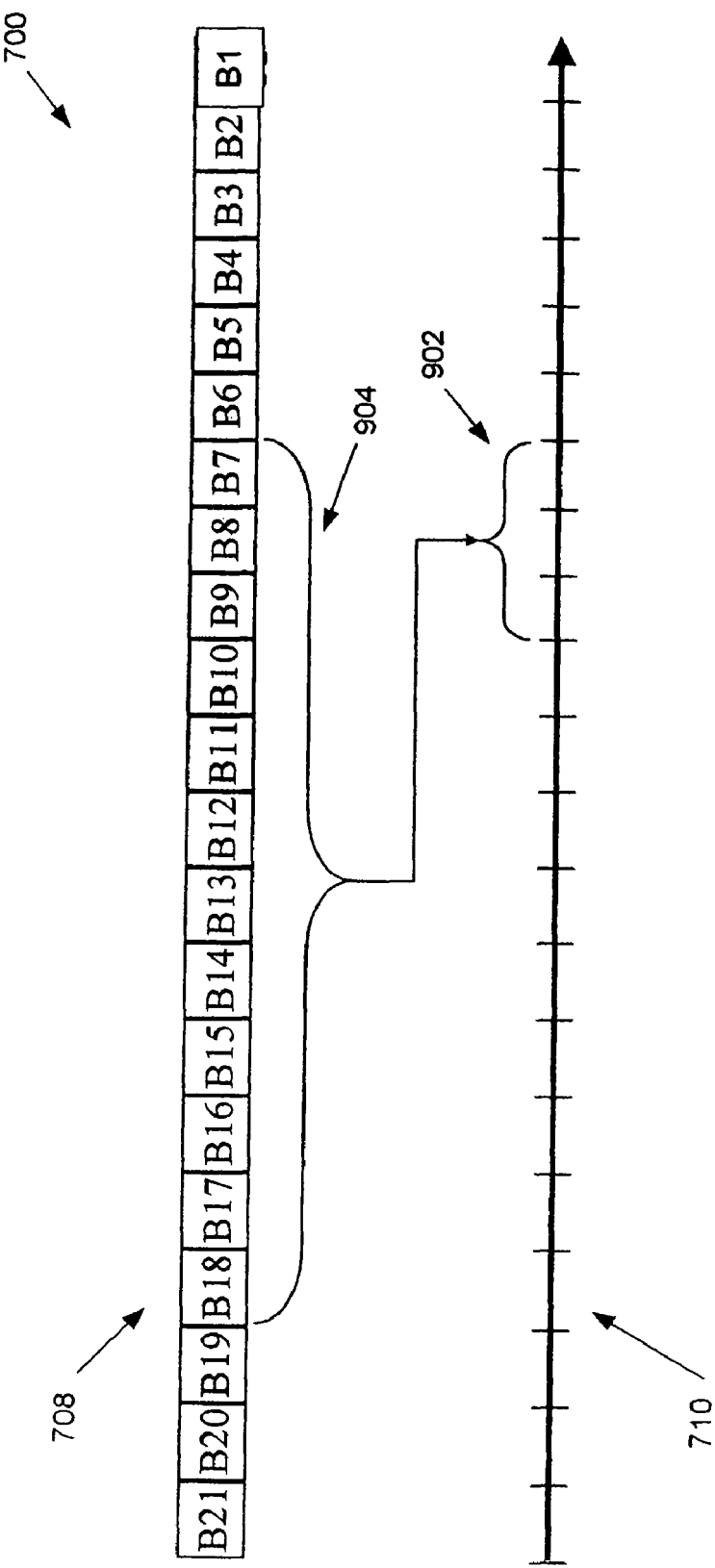

Turning now to FIG. 9, there is shown a diagram 900 illustrating the balance information used for estimating spending in a third successive quarter 902 using a third twelve-month period of balance information 804. Spending in each of these three months of the third previous quarter 902 is based on known balance information B7-B18.

Figure 10:
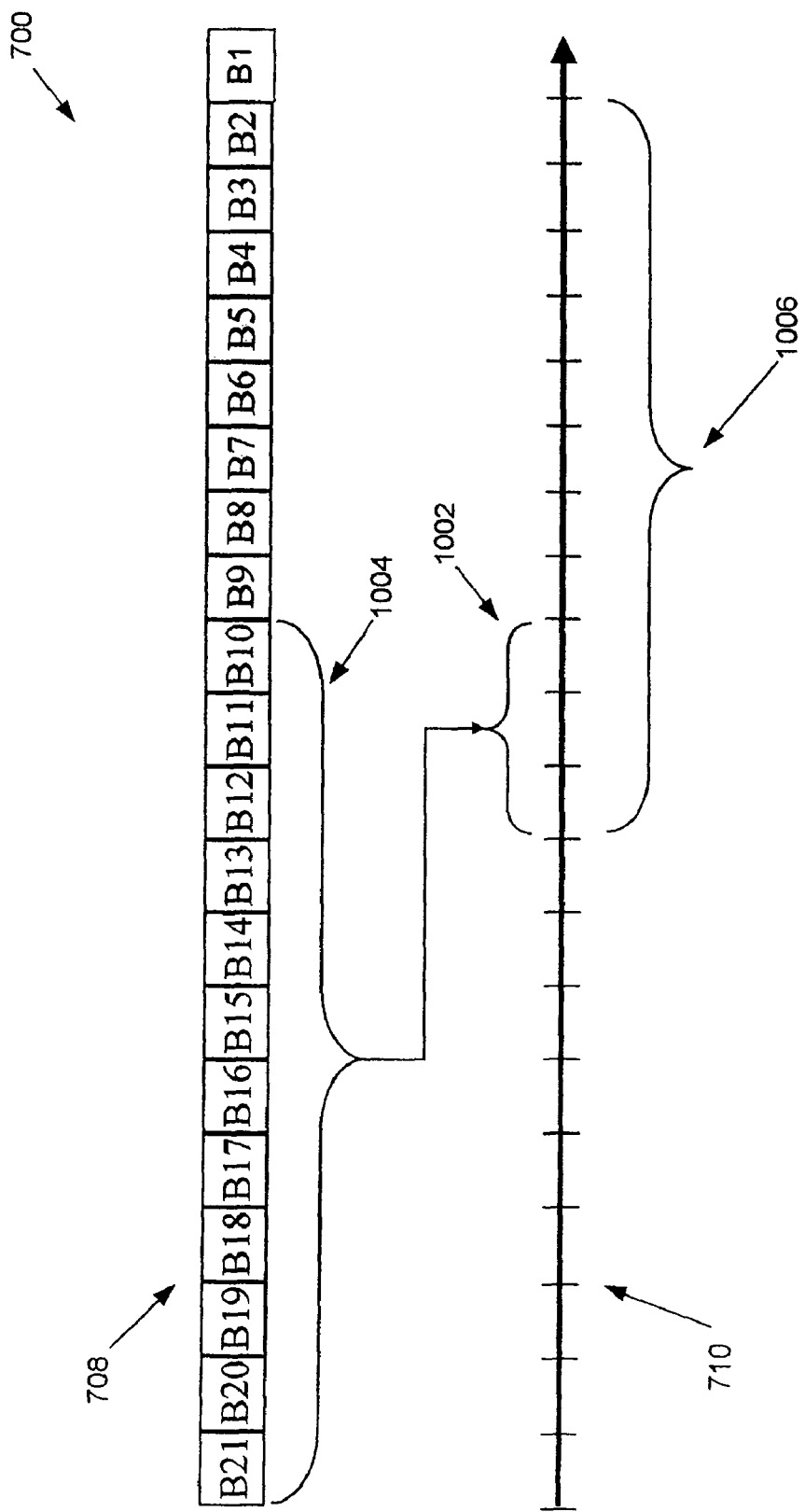

Turning now to FIG. 10, there is shown a diagram 1000 illustrating the balance information used for estimating spending in a fourth previous quarter 1002 using a fourth twelve-month period of balance information 1004. Spending in each of these three months of the fourth previous quarter 1002 is based on balance information B10-B21.

It should be readily appreciated that as the rolling calculations proceed, the consumer's category may change based on the outputs that result, and, therefore, different formula corresponding to the new category may be applied to the consumer for different periods of time. The rolling manner described above maximizes the known data used for estimating consumer spend in a previous twelve month period.

Based on the final output generated for the customer, commensurate purchasing incentives may be identified and provided to the consumer, for example, in anticipation of an increase in the consumer's purchasing ability as projected by the output file. In such cases, consumers of good standing, who are categorized as transactors with a projected increase in purchasing ability, may be offered a lower financing rate on purchases made during the period of expected increase in their purchasing ability, or may be offered a discount or rebate for transactions with selected merchants during that time.

In another example, and in the case where a consumer is a revolver, such consumer with a projected increase in purchasing ability may be offered a lower annual percentage rate on balances maintained on their credit account.

Other like promotions and enhancements to consumers' experiences are well known and may be used within the processes disclosed herein.

Various statistics for the accuracy of the processes 300 and 600 are provided in FIGS. 11-18, for which a consumer sample size of was analyzed by the process 200 and validated using 24 months of historic actual spend data. The table 1100 of FIG. 11 shows the number of consumers having a balance of $5000 or more for whom the estimated paydown percentage (calculated in step 604 above) matched the actual paydown percentage (as determined from internal transaction data and external consumer panel data).

The table 1200 of FIG. 12 shows the number of consumers having a balance of $5000 or more who were expected to be transactors or revolvers, and who actually turned out to be transactors and revolvers based on actual spend data. As can be seen, the number of expected revolvers who turned out to be actual revolvers (80539) was many times greater than the number of expected revolvers who turned out to be transactors (1090). Likewise, the number of expected and actual transactors outnumbered by nearly four-to-one the number of expected transactors that turned out to be revolvers.

The table 1300 of FIG. 13 shows the number of estimated versus actual instances in the consumer sample of when there occurred a balance transfer into an account. For instance, in the period sampled, there were 148,326 instances where no balance transfers were identified in step 606 above, and for which a comparison of actual consumer data showed there were in fact no balance transfers in. This compares to only 9,534 instances where no balance transfers were identified in step 606, but there were in fact actual balance transfers.

Figure 14:

The table 1400 of FIG. 14 shows the accuracy of estimated spending (in steps 608-612) versus actual spending for consumers with account balances (at the time this sample testing was performed) greater than $5000. As can be seen, the estimated spending at each spending level most closely matched the same actual spending level than for any other spending level in nearly all instances.

Figure 15:

The table 1500 of FIG. 15 shows the accuracy of estimated spending (in steps 608-612) versus actual spending for consumers having most recent account balances between $1600 and $5000. As can be readily seen, the estimated spending at each spending level most closely matched the same actual spending level than for any other spending level in all instances.

The table 1600 of FIG. 16 shows the accuracy of estimated spending versus actual spending for all consumers in the sample. As can be readily seen, the estimated spending at each spending level most closely matched the same actual spending level than for any other actual spending level in all instances.

The table 1700 of FIG. 17 shows the rank order of estimated versus actual spending for all consumers in the sample. This table 1700 readily shows that the number of consumers expected to be in the bottom 10% of spending most closely matched the actual number of consumers in that category, by 827,716 to 22,721. The table 1700 further shows that the number of consumers expected to be in the top 10% of spenders most closely matched the number of consumers who were actually in the top 10%, by 71,773 to 22,721.

The table 1800 of FIG. 18 shows estimated versus actual annual spending for all consumers in the sample over the most recent year of available data. As can be readily seen, the expected number of consumers at each spending level most closely matched the same actual spending level than any other level in all instances.

Finally, the table 1900 of FIG. 19 shows the rank order of estimated versus actual total annual spending for all the consumers over the most recent year of available data. Again, the number of expected consumers in each rank most closely matched the actual rank than any other rank.

Prospective customer populations used for modeling and/or later evaluation may be provided from any of a plurality of available marketing groups, or may be culled from credit bureau data, targeted advertising campaigns or the like. Testing and analysis may be continuously performed to identify the optimal placement and required frequency of such sources for using the size of spending wallet calculations. The processes described herein may also be used to develop models for predicting a size of wallet for an individual consumer in the future.

Institutions adopting the processes disclosed herein may expect to more readily and profitably identify opportunities for prospect and customer offerings, which in turn provides enhanced experiences across all parts of a customer's lifecycle. In the case of a credit provider, accurate identification of spend opportunities allows for rapid provisioning of card member offerings to increase spend that, in turn, results in increased transaction fees, interest charges and the like. The careful selection of customers to receive such offerings reduces the incidence of fraud that may occur in less disciplined card member incentive programs. This, in turn, reduces overall operating expenses for institutions.

Although the best methodologies of the disclosure have been particularly described above, it is to be understood that such descriptions have been provided for purposes of illustration only, and that other variations both in form and in detail can be made by those skilled in the art without departing from the spirit and scope thereof, which is defined first and foremost by the appended claims.

What is claimed is:

1. A method for modeling consumer behavior for estimating consumer spending comprising:
validating, by a computer-based system for modeling consumer behavior for estimating consumer spending, a model of consumer spending patterns using consumer panel data, wherein the computer-based system comprises a processor and non-transitory memory;
estimating, by the computer-based system, a purchasing ability of the consumer based on tradeline data, discounting and the model, wherein the tradeline data is received for a plurality of accounts of a consumer over a previous period of time, and wherein the discounting includes discounting any spending identified for any of the plurality of accounts for any portion of the previous period of time in which a balance transfer to such account is identified; and
outputting, by the computer-based system, the purchasing ability.

2. The method of claim 1, further comprising refining the model based on additional consumer panel data.

3. The method of claim 1, further comprising deriving the model for a category.

4. The method of claim 1, further comprising analyzing individual consumer data and aggregated consumer data to determine spending behavior for a category of consumers, wherein the individual consumer data and the aggregated consumer data include consumer panel data, tradeline data and internal customer data.

5. The method of claim 1, the previous period of time comprising at least twelve months.

6. The method of claim 1, the validating further comprising validating the model using tradeline and consumer panel data of a plurality of consumers.

7. The method of claim 1, the plurality of accounts including at least one of: a credit card account, a charge card account, a line of credit, a checking account and a savings account.

8. The method of claim 1, further comprising deriving the model by determining at least two categories of customers based on aggregated customer data, a first category including customers that primarily pay down credit account balances and a second category including customers that primarily revolve credit account balances.

9. The method of claim 8, further comprising assigning one of the first category and the second category to the customer based on the tradeline data.

10. The method of claim 1, further comprising changing terms of a credit account of the consumer based on the estimating.

11. The method of claim 10, the changing further comprising changing a credit limit of the credit account.

12. The method of claim 10, the changing further comprising providing a discount on a purchase to the customer in response to the estimating indicating an increase in a purchasing ability of the customer.

13. The method of claim 1, further comprising selecting the consumer from a set of customers that do not have a delinquent account status.

14. The system of claim 1, further comprising refining the model based on additional consumer panel data.

15. The system of claim 1, further comprising deriving the model for a category.

16. The system of claim 1, further comprising analyzing individual consumer data and aggregated consumer data to determine spending behavior for a category of consumers, wherein the individual consumer data and the aggregated consumer data include consumer panel data, tradeline data and internal customer data.

17. The system of claim 1, the previous period of time comprising at least twelve months.

18. The system of claim 1, the validating further comprising validating the model using tradeline and consumer panel data of a plurality of consumers.

19. An article of manufacture including a computer readable medium having instructions stored thereon that, in response to execution by a computer-based system for modeling consumer behavior for estimating consumer spending, cause the computer-based system to perform operations comprising:

validating, by the computer-based system, a model of consumer spending patterns using consumer panel data, wherein the computer-based system comprises a processor and non-transitory memory;

estimating, by the computer-based system, a purchasing ability of the consumer based on tradeline data, discounting and the model, wherein the tradeline data is received for a plurality of accounts of a consumer over a previous period of time, and wherein the discounting includes discounting any spending identified for any of the plurality of accounts for any portion of the previous period of time in which a balance transfer to such account is identified; and outputting, by the computer-based system, the purchasing ability.

20. A system for estimating consumer spending, the system comprising:

a non-transitory memory communicating with a processor for modeling consumer behavior for estimating the consumer spending, the non-transitory memory having instructions stored thereon that, in response to execution by the processor, cause the processor to perform operations comprising:

validating, by the processor, a model of consumer spending patterns using consumer panel data, wherein the computer-based system comprises a processor and non-transitory memory;

estimating, by the processor, a purchasing ability of the consumer based on tradeline data, discounting and the model, wherein the tradeline data is received for a plurality of accounts of a consumer over a previous period of time, and wherein the discounting includes discounting any spending identified for any of the plurality of accounts for any portion of the previous period of time in which a balance transfer to such account is identified; and outputting, by the processor, the purchasing ability.

* * * * *

UNITED STATES PATENT AND TRADEMARK OFFICE
CERTIFICATE OF CORRECTION

PATENT NO.        : 8,131,639 B2                                     Page 1 of 1
APPLICATION NO.   : 13/165627
DATED             : March 6, 2012
INVENTOR(S)       : Kathleen B. Haggerty et al.

It is certified that error appears in the above-identified patent and that said Letters Patent is hereby corrected as shown below:

On the Title page, Item (73) Assignee, after "Services" please insert therefor --Company--.

In Column 12 Line 66 Claim 14, please delete "1" and insert therefor --20--.

In Column 13 Line 1 Claim 15, please delete "1" and insert therefor --20--.

In Column 13 Line 3 Claim 16, please delete "1" and insert therefor --20--.

In Column 13 Line 9 Claim 17, please delete "1" and insert therefor --20--.

In Column 13 Line 11 Claim 18, please delete "1" and insert therefor --20--.

Signed and Sealed this
Eighteenth Day of September, 2012

David J. Kappos
*Director of the United States Patent and Trademark Office*